United States Patent
Vinogradov et al.

(10) Patent No.: US 10,318,778 B2
(45) Date of Patent: Jun. 11, 2019

(54) REDUCING PERCEIVED BRIGHTNESS OF ILLUMINATION LIGHT SOURCE IN ELECTRO-OPTICAL READERS THAT ILLUMINATE AND READ TARGETS BY IMAGE CAPTURE

(71) Applicant: Symbol Technologies, Inc., Schaumburg, IL (US)

(72) Inventors: Igor R. Vinogradov, Oakdale, NY (US); Rong Liu, Centereach, NY (US); Yuly Mitelman, Stony Brook, NY (US); Eric S. Trongone, West Babylon, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 796 days.

(21) Appl. No.: 13/677,956

(22) Filed: Nov. 15, 2012

(65) Prior Publication Data
US 2014/0131596 A1 May 15, 2014

(51) Int. Cl.
*G06K 7/10* (2006.01)

(52) U.S. Cl.
CPC .............................. *G06K 7/10831* (2013.01)

(58) Field of Classification Search
CPC ......... G06K 7/10; G06K 7/04; G06K 7/10831
USPC ......... 250/208.1, 216, 221, 239; 235/462.31, 235/462.41, 462.42, 462.43
See application file for complete search history.

(56) References Cited

U.S. PATENT DOCUMENTS

| | | | |
|---|---|---|---|
| 5,449,892 A * | 9/1995 | Yamada | G06K 7/10594 235/462.35 |
| 6,854,650 B2 | 2/2005 | Hattersley et al. | |
| 7,537,164 B2 * | 5/2009 | Joseph et al. | 235/462.32 |
| 7,614,563 B1 | 11/2009 | Nunnink et al. | |
| 7,832,641 B2 | 11/2010 | Blake et al. | |
| 8,028,913 B2 | 10/2011 | Liu et al. | |
| 8,056,807 B2 | 11/2011 | Lo et al. | |
| 8,059,232 B2 * | 11/2011 | Zhuang | G02F 1/133528 349/97 |
| 2007/0052911 A1 * | 3/2007 | Asao | G02F 1/133504 349/156 |
| 2008/0156881 A1 | 7/2008 | Vinogradov | |
| 2010/0116889 A1 | 5/2010 | Stern | |

* cited by examiner

*Primary Examiner* — Georgia Y Epps
*Assistant Examiner* — Don J Williams
(74) *Attorney, Agent, or Firm* — Yuri Astvatsaturov

(57) ABSTRACT

Targets to be electro-optically read by image capture are illuminated with illumination light emitted from an illumination light source and directed along an illumination path through a window to the targets, and return light from the targets is captured through the window and projected along an imaging path to an array of light sensors of an imaging system. An optical element is located in both the illumination path and the imaging path, and has a light-reflecting, non-diffusing portion for directing the captured return light incident on the light-reflecting portion along a folded imaging path to the array, and a light-diffusing portion for diffusing the illumination light incident on the light-diffusing portion along a folded illumination path to scatter and blur an image of the illumination light source, to increase an apparent size of the illumination light source, and to reduce a perceived brightness of the illumination light source.

17 Claims, 6 Drawing Sheets

REDUCING PERCEIVED BRIGHTNESS OF ILLUMINATION LIGHT SOURCE IN ELECTRO-OPTICAL READERS THAT ILLUMINATE AND READ TARGETS BY IMAGE CAPTURE

FIELD OF THE DISCLOSURE

The present disclosure relates generally to an apparatus for, and a method of, reading targets by image capture and, more particularly, to illuminating the targets with an illumination light source and, still more particularly, to reducing the perceived brightness of the illumination light source.

BACKGROUND

Solid-state imaging readers, that are configured either as vertical slot scanners each having a generally vertically arranged, upright window, or as flat-bed or horizontal slot scanners each having a generally horizontally arranged window, or as bi-optical, dual window scanners each having both generally horizontally and vertically arranged windows, or as stand-mounted, stationary scanners having a presentation window, have been installed as workstations in many venues, such as supermarkets, department stores, and other kinds of retailers, as well as warehouses, and other kinds of industrial settings, for many years, to electro-optically read by image capture a plurality of symbol targets, such as one-dimensional symbols, particularly Universal Product Code (UPC) bar code symbols, and two-dimensional symbols, as well as non-symbol targets, such as driver's licenses, receipts, signatures, etc., the targets being associated with objects or products to be processed by the workstations. An operator or a customer may slide or swipe a product associated with, or bearing, a target in a moving direction across and past a window of the workstation in a swipe mode. Alternatively, the operator or the customer may momentarily present the target associated with, or borne by, the product to an approximate central region of a window, and steadily momentarily hold the target in front of the window, in a presentation mode. The choice depends on user preference, or on the layout of the workstation, or on the type of the target.

Known imaging workstations typically include an imaging scan engine or module for supporting a solid-state, image sensor or imager comprising an array of pixels or photosensors, for sensing return light returning through a window of the workstation from a target being imaged. The image sensor may be a one- or two-dimensional charge coupled device (CCD) or a complementary metal oxide semiconductor (CMOS) device, operable at a frame rate, and is analogous to the image sensors used in electronic digital cameras. The known imaging workstations also typically include an illuminating light system for illuminating the target with illumination light from an illumination light source, e.g., one or more light emitting diodes (LEDs), through the window of the workstation; an imaging lens assembly, e.g., one or more imaging lenses, for capturing return ambient and/or illumination light scattered and/or reflected from the target through the window of the workstation over a reading field of view and over a range of working distances relative to the window; and electrical circuitry for producing electronic analog signals corresponding to the intensity of the light captured by the image sensor over the reading field of view, and for digitizing the analog signal. The electrical circuitry typically includes a controller or programmed microprocessor for controlling operation of the electrical components supported by the workstations, and for processing the target and/or decoding the digitized signal based upon a specific symbology when the target is a symbol.

Some known workstations continuously capture and attempt to process and/or decode targets without regard to whether or not a target is actually in the reading field of view of the scan engine. However, continuous, repetitive, flashing of bright intense light from the LEDs of the illuminating light system consumes and wastes energy, degrades component lifetimes, and can be perceived as bothersome, distracting and annoying to the operators of the readers and to nearby consumers being served.

To alleviate these problems, the art has proposed periodically activating, i.e., waking-up, the imaging scan engine with a few different approaches. For example, the imaging scan engine can be operated with a very low duty cycle (about 10%). Thus, the imaging scan engine wakes up for a very short period of time to scan the reading field of view and tries to detect a presence of a target therein. However, this creates sluggishness in the reader's performance and delays in decoding, which can be perceived as an engineering defect. Also, the distracting flashing illumination light is still present during the wake-up time period.

Another approach for the imaging scan engine tries to detect the target without energizing the illumination LEDs. However, under low ambient light conditions, for example, when a reader is located in a dark corner in a retail environment, the activation time will be slow since the exposure of the image sensor has to be very long in order to acquire an image of acceptable brightness for object detection. Again, the reader's performance is sluggish.

Still another approach is to install an object sensing system inside the workstation, for activating the scan engine, e.g., the illuminating light system, only if an object or product bearing, or associated with, a target is detected within the active reading field of view of the scan engine. The object sensing system has one or more object light sources for emitting object sensing light, typically infrared (IR) light, and at least one object sensor for sensing the return IR light reflected and/or scattered from the object over an object detection field of view. Although generally satisfactory for its intended purpose, the use of an object sensing system is disadvantageous, because a portion of the IR light incident on the window of the workstation is reflected therefrom back into the object detection field of view of the object sensor. This reflected portion of the IR light creates undesirable hot spots in the object detection field of view and may significantly compromise object sensor performance.

Accordingly, there is a need for an apparatus for, and a method of, illuminating and reading all the targets presented to a workstation, without bothering, distracting and annoying the operators and/or consumers by exposing them to continuous, repetitive, flashing of bright intense light from the illuminating light system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
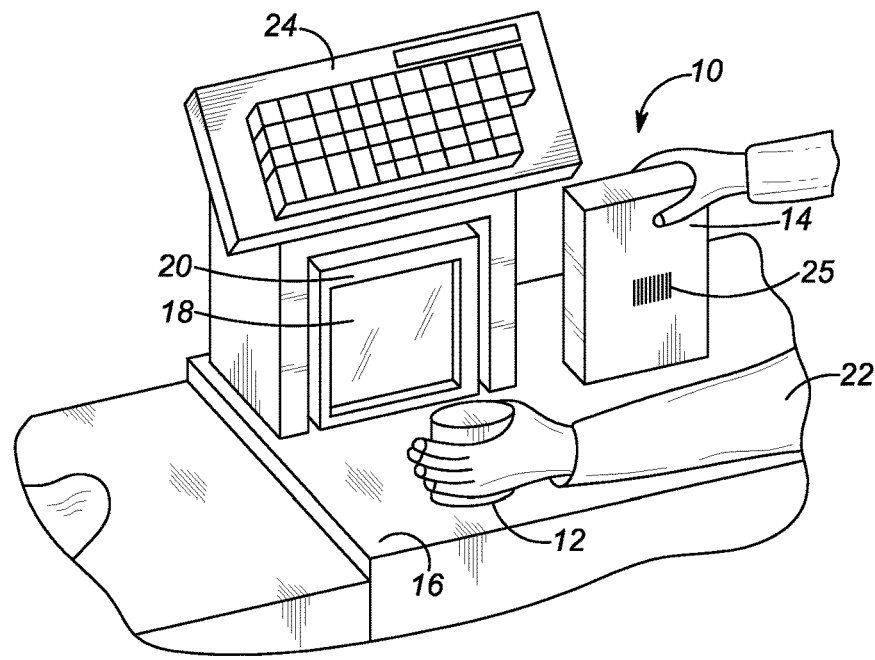
FIG. 1 is a perspective view of an apparatus or electro-optical workstation configured as a vertical slot scanner in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with one aspect of the present disclosure, an apparatus for electro-optically reading targets by image capture, includes a housing, a window supported by the housing, an illumination system, an imaging lens system, and an optical element. The illumination system is supported by the housing and is operative for illuminating the targets with illumination light emitted by an illumination light source and directed along an illumination path through the window to the targets. The imaging system includes a solid-state imager supported by the housing and has an array of light sensors looking at an imaging or reading field of view that extends through the window to the targets, and also includes an imaging lens system operative for capturing return illumination light from the targets through the window, and for projecting the captured return illumination light along an imaging path to the array.

The optical element is located in both the illumination path and the imaging path. The optical element is preferably of one-piece construction and has a light-reflecting, non-diffusing portion for directing the captured return illumination light incident on the light-reflecting portion along the imaging path to the imaging system. Preferably, the light-reflecting portion is also operative for folding the imaging path. The optical element also has a light-diffusing portion for folding the illumination path and for diffusing the illumination light incident on the light-diffusing portion along the folded illumination path. The light-diffusing portion serves to scatter and blur an image of the illumination light source, to increase an apparent size of the illumination light source, and to reduce a perceived brightness of the illumination light source, thereby alleviating the operators of the readers and/or nearby consumers from being subjected to the above-described bothersome, distracting and annoying effects of the continuous, repetitive, flashing of bright intense light from the illumination system.

Advantageously, the one-piece optical element, in one embodiment, is a molded plastic piece, and the light-reflecting portion is located on one part, e.g., a central part, of the plastic piece, and the light-diffusing portion is located on an outer surface of a remaining part of the plastic piece. The central, light-reflecting portion may be flat or curved, and has a surface finish that is approximately better, and less, than five micrometers, in order to reflect the imaging field of view without noticeable image degradation. The outer, light-diffusing portion is constituted by microstructures that are either embossed or molded on the outer surface of the plastic piece. The microstructures have a feature size or surface finish that exceeds five micrometers. Both the central, light-reflecting portion and the outer, light-diffusing portion are preferably coated with an optically reflective coating, such as gold, aluminum, enhanced aluminum, or the like. In another embodiment, the optical element is a glass mirror, and the light-reflecting portion is a reflective coating on a central part of the glass mirror, and the light-diffusing portion is constituted by microstructures, preferably etched structures, on an outer surface of a remaining part of the glass mirror.

In accordance with another aspect of the present disclosure, a method of electro-optically reading targets by image capture, is performed by supporting a window on a housing, illuminating the targets with illumination light emitted by an illumination light source and directed along an illumination path through the window to the targets, capturing return illumination light from the targets through the window, projecting the captured return illumination light along an imaging path to an array of light sensors of a solid-state imager, locating an optical element in the illumination path and the imaging path, and configuring the optical element with a light-reflecting portion for directing the captured return illumination light incident on the light-reflecting portion along the imaging path to the array, and with a light-diffusing portion for folding the illumination path and for diffusing the illumination light incident on the diffusing portion along the folded illumination path to scatter and blur an image of the illumination light source, to increase an apparent size of the illumination light source, and to reduce a perceived brightness of the illumination light source.

Turning now to the drawings, reference numeral 10 in FIG. 1 generally identifies an electro-optical reading workstation for processing transactions at a checkout counter of a retail site at which objects or products, such as a can 12 or a box 14, each associated with, and preferably bearing, a target 25 such as a printed bar code symbol, are processed for purchase. The counter includes a countertop 16 across which the products are presented or slid at a swipe speed past and across a generally vertical or upright, generally planar, light-transmissive window 18 of a box-shaped housing 20 of an imaging reader configured as a vertical slot scanner mounted on the countertop 16. A user 22, preferably a checkout operator or a consumer, is located at one side of the countertop 16, and the housing 20 is located at the opposite side. A cash/credit register 24 is located within easy reach of the user 22. The housing 20 is portable and lightweight and may be picked up from the countertop 16 by the user 22, and the window 18 may be aimed at the target 25, preferably on a product too heavy or too large to be easily positioned on the countertop 16 in front of the housing 20 in the workstation mode.

Figure 2:
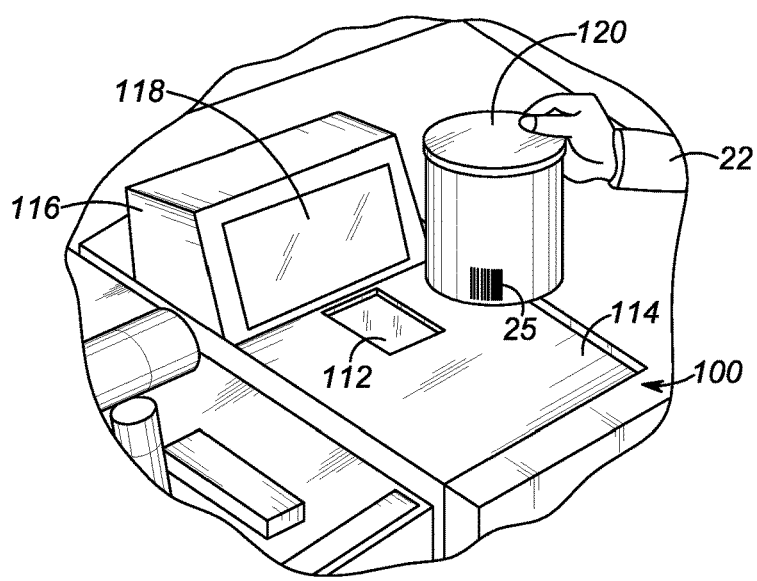
FIG. 2 is a perspective view of another apparatus or electro-optical workstation configured as a dual window, bi-optical workstation in accordance with this invention.

FIG. 2 depicts a dual window, bi-optical, point-of-transaction workstation 100 used by retailers to process transactions involving the purchase of products 120 bearing an identifying target, such as the printed target 25 described above. Workstation 100 has a generally horizontal window 112 set flush with, or recessed into, a countertop 114, and a vertical or generally vertical (referred to as "vertical" or "upright" hereinafter) window 118 set flush with, or recessed into, a raised housing portion 116 above the countertop. In use, the user 22 processes the product 120 bearing the target 25 thereon, past the windows 112, 118 by swiping the target 25 on the product 120 across a respective window in the abovementioned swipe mode, or by presenting the target 25 on the product 120 at the respective window in the abovementioned presentation mode. The target 25 may located on any of the top, bottom, right, left, front and rear, sides of the product 120.

Figure 3:
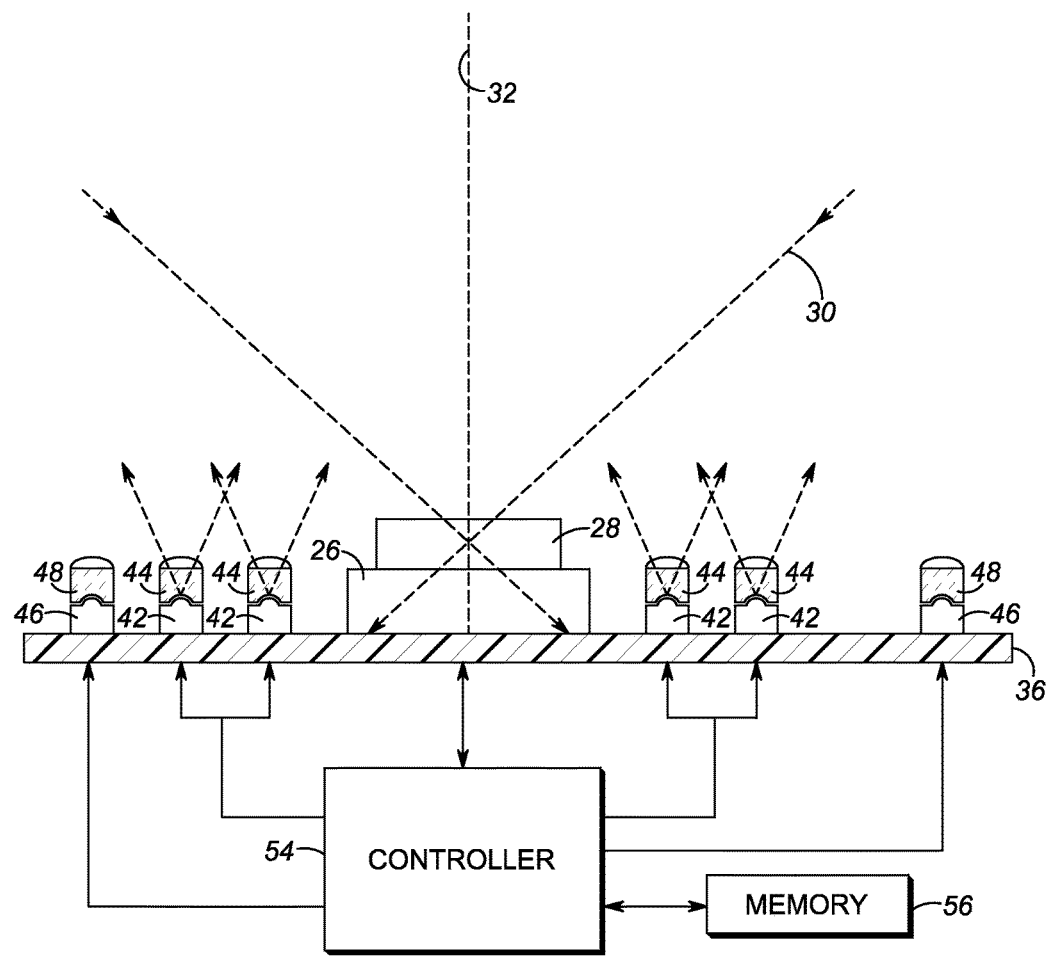
FIG. 3 is a part-schematic, part-diagrammatic view depicting various components of the workstation of FIG. 1 or FIG. 2.

Inside each workstation, as schematically shown in FIG. 3, is an imaging system that includes an image sensor or imager 26 operable at a frame rate of multiple frames per second, and mounted on a printed circuit board (PCB) 36, and an imaging lens assembly 28 mounted in front of the imager 26. The imager 26 is a solid-state device, for example, a CCD or a CMOS imager and has a linear or area array of addressable image sensors or pixels, preferably of submegapixel or supermegapixel size, having a reading field of view 30 that diverges as considered in a direction away from the respective windows 18, 118, 120 in both horizontal and vertical directions. The imaging lens assembly 28 has an optical axis 32 generally perpendicular to the imager 26 and is operative for capturing light through the respective windows 18, 118, 120 from the symbol target 25 of FIGS. 1-2, or like target, located in a range of working distances along the optical axis 32.

An illumination light system is also mounted in each workstation and preferably includes a plurality of illumination light sources, e.g., two pairs of light emitting diodes (LEDs) 42, mounted on the PCB 36 and arranged at opposite sides of the imager 26. Two pairs of illumination lenses 44 are mounted in front of the illumination LEDs 42 to uniformly illuminate the target 25 with illumination light.

An object sensing system is optionally mounted in each workstation and is operative for sensing an object, e.g., any of the aforementioned products 12, 14, 120 associated with the target 25, and for generating a trigger signal to initiate the reading. The object sensing system includes an object light source, preferably a pair of infrared (IR) light emitting diodes (LEDs) 46 mounted on the PCB 36 at opposite sides of the imager 26, and a pair of IR lenses 48 mounted in front of the IR LEDs 46, and together operative for directing object sensing IR light, which is invisible to the human eye, in a wavelength range from about 700 nm to about 1100 nm, over a viewing angle through the window 18 at the objects 12, 14, 120 for return therefrom, and an object light sensor 50 (see FIG. 4) for detecting return object sensing IR light returned from the objects 12, 14, 120 along an object detection path through the respective windows 18, 118, 120 over an object detection field of view.

Figure 4:
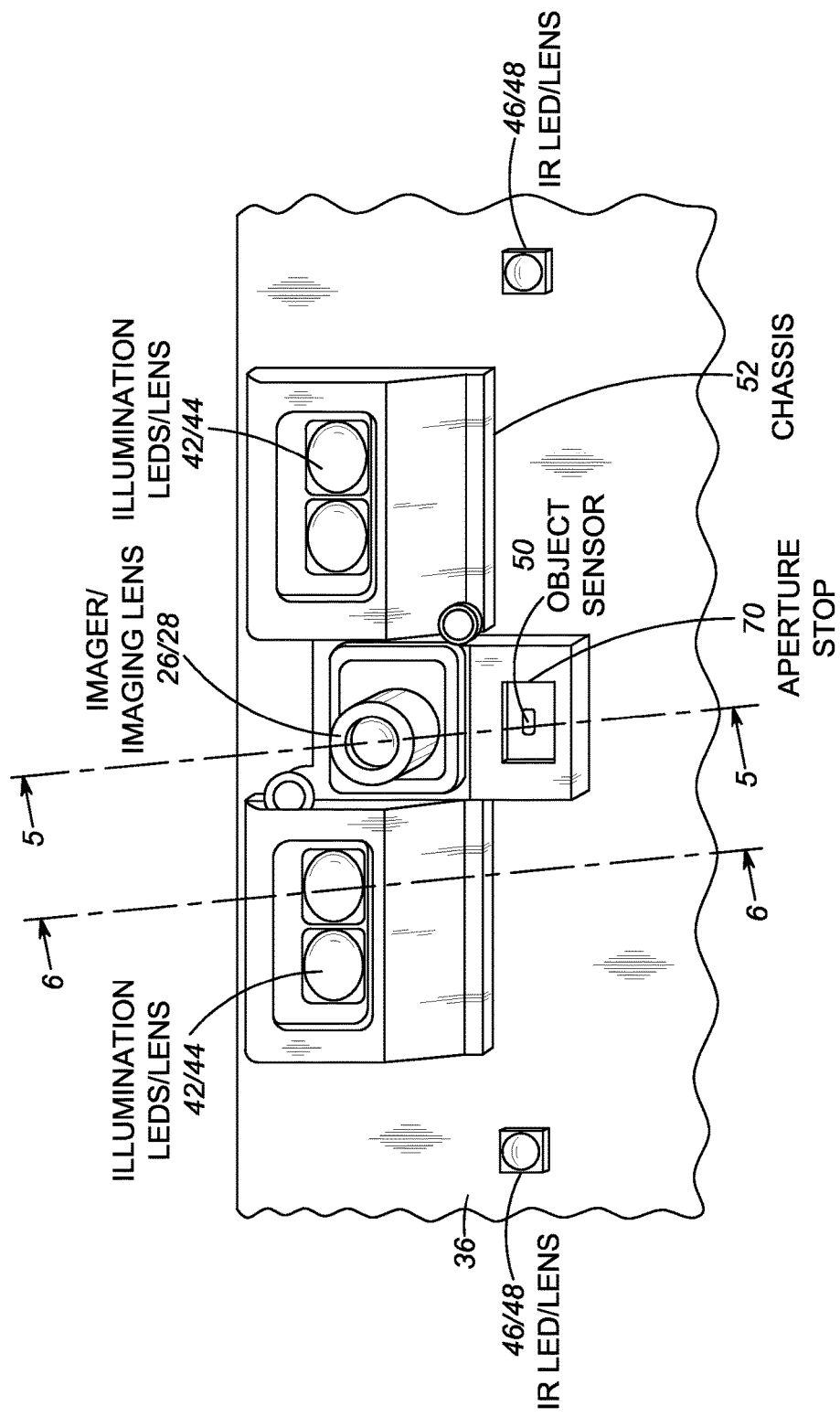
FIG. 4 is a broken-away, enlarged, perspective view depicting some of the components of FIG. 3.

The viewing angle of the IR LEDs 46 is approximately equal to the object detection field of view of the IR object sensor 50 for better system efficiency and pointing in the direction of the object of interest. The object detection field of view substantially overlaps the reading field of view 30. As best seen in FIG. 4, the object IR light sensor 50 is mounted on the PCB 36 between the IR LEDs 46 and below the imager 26. Other locations for the object IR light sensor 50 are contemplated. Also, all of the lenses 28, 44, and 48 are supported by a chassis 52 above the PCB 36 on which the imager 26, the illumination LEDs 42 and the IR LEDs 46 are mounted. The IR object sensor 50 may have an aperture stop 70 and a daylight filter to improve the signal-to-ambient light ratio for better performance.

Returning to FIG. 3, the imager 26, the illumination LEDs 42 and the IR LEDs 46 are operatively connected to a controller or programmed microprocessor 54 operative for controlling the operation of all these electrical components. A memory 56, preferably a first-in, first-out buffer, is connected and accessible to the controller 54. Preferably, the controller 54 is the same as the one used for decoding the return illumination light scattered from the target 25 and for processing the captured target images.

Figure 5:
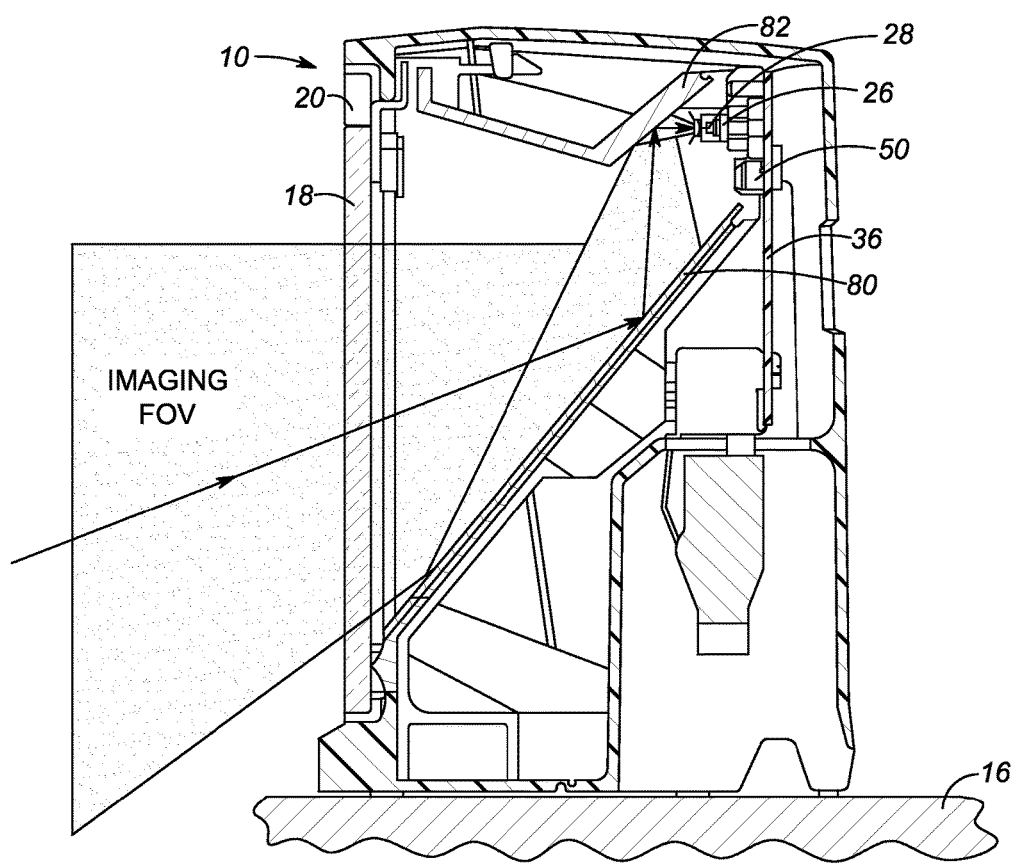
FIG. 5 is a sectional view taken on line 5-5 of FIG. 4 through the exemplary workstation of FIG. 1 and depicting operation of an imaging system in accordance with this invention.
Figure 6:
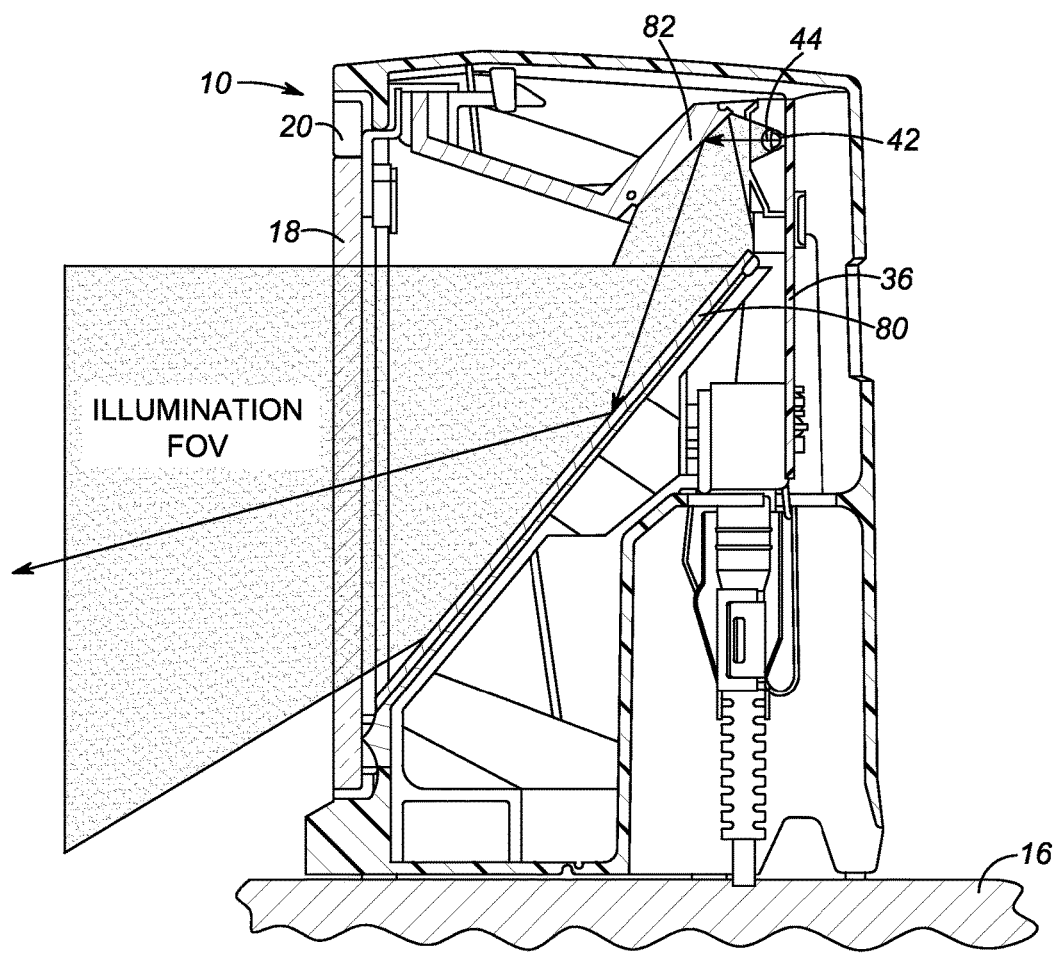
FIG. 6 is another sectional view taken on line 6-6 of FIG. 4 through the exemplary workstation of FIG. 1 and depicting operation of an illumination system in accordance with this invention.

Turning now to FIGS. 5-6, the housing 20 of the representative reader 10 of FIG. 1 is illustrated, together with the upright window 18. The imager 26 is located on the PCB 36 that is mounted in a vertical plane. In FIG. 5, the imaging lens system 28 captures return light over an imaging field of view from the target 25 through the window 18. A fold mirror 80 at a lower elevation in the housing 20 reflects the captured return light along an imaging path upwardly to an optical element 82 located at a higher elevation, whereupon the captured return light is again reflected to the imaging lens system 28 and to the imager 26. The imaging path, shown by speckled dots in FIG. 5, is twice folded: once, at the lower fold mirror 80, and then again, at the upper optical element 82. The fold mirror 80 has a larger area than the optical element 82. Preferably, each of the fold mirror 80 and the optical element 82 is a generally planar part.

Analogously, in FIG. 6, the LEDs 42 of the illumination system are also located on the vertical PCB 36, and the illumination light is directed along an illumination path to the smaller, upper, optical element 82, whereupon the illumination light is again reflected to the larger, lower fold mirror 82, whereupon the illumination light is again reflected through the window 18 to the target 25. The illumination path, shown by speckled dots in FIG. 6, is twice folded: once, at the upper optical element 82, and then again, at the lower fold mirror 80.

Figure 7:
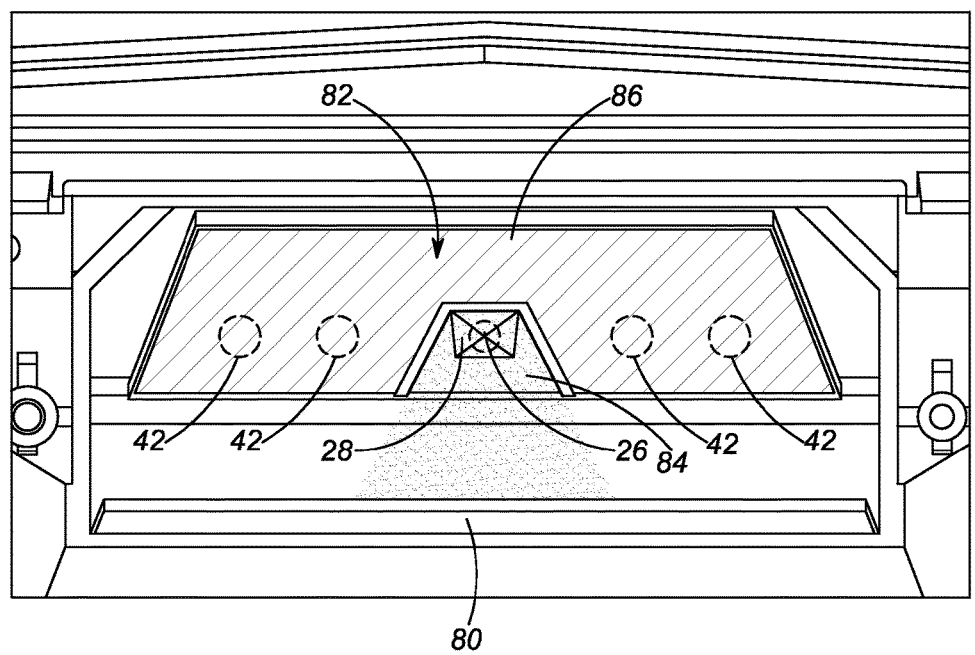
FIG. 7 is a broken-away, enlarged, perspective view depicting an optical element in accordance with this invention.

The optical element 82 is located in, and shared by, both the illumination path and the imaging path. As best shown in FIG. 7, the optical element 82 is preferably of one-piece construction and has a light-reflecting, non-diffusing portion 84 for directing the captured return illumination light incident on the light-reflecting portion 84 along the folded imaging path to the imaging system. The optical element 82 also has a textured, light-diffusing portion 86 for diffusing the illumination light incident on the light-diffusing portion 84 along the folded illumination path. The light-diffusing portion 86 can be replicated on a plastic or a glass substrate from a holographically recorded master, embossed directly on an outer surface, injection molded into different optical components, or etched into hard substrates such as silica, silicon, or calcium fluoride, and serves to scatter and blur an image of the illumination light source, to increase an apparent size of the illumination light source, and to reduce a perceived brightness of the illumination light source, thereby alleviating the operators of the readers and/or nearby consumers from being subjected to the above-described bothersome, distracting and annoying effects of the continuous, repetitive, flashing of bright intense light from the illumination system.

Advantageously, the one-piece optical element 82, in one embodiment, is a molded plastic piece, and the light-reflecting portion 84 is located on one part, e.g., a central part, of the plastic piece, and the light-diffusing portion 86 is located on an outer surface of a remaining part of the plastic piece. The central, light-reflecting portion 84 may be flat or curved, and has a surface finish that is approximately better, and less, than five micrometers, in order to reflect the imaging field of view without noticeable image degradation. The outer, light-diffusing portion 86 is constituted by microstructures that are either embossed or molded on the outer surface of the plastic piece. The microstructures have a feature size or surface finish that exceeds five micrometers. Both the central, light-reflecting portion 84 and the outer, light-diffusing portion 86 are preferably coated with an optically reflective coating, such as gold, aluminum, enhanced aluminum, or the like. In another embodiment, the optical element 82 is a glass mirror, and the light-reflecting portion 84 is a reflective coating on a central part of the glass mirror, and the light-diffusing portion 86 is constituted by microstructures, preferably etched structures, on an outer surface of a remaining part of the glass mirror.

It will be understood that each of the elements described above, or two or more together, also may find a useful application in other types of constructions differing from the types described above. For example, the number of illumination LEDs 42 and their location can be different from those illustrated in the drawings; the number of IR LEDs 46 and their location can also be different from those illustrated in the drawings; and more than one object sensor 50 can be employed. Workstations having different shapes than those illustrated, with one or more windows, are also within the spirit of this invention. For example, a flat-bed workstation having a single generally horizontal window, or a gun-shaped housing mounted on a stationary stand or mount are other advantageous configurations. In addition, although FIGS. 5-7 has been illustrated and described with respect to the window 18 of the workstation 10, the invention described herein is equally applicable to either window 112 or 118 of the workstation of FIG. 2. Although only one imager 26 has been illustrated, it will be understood that any workstation, especially the bi-optical workstation of FIG. 2, can, and frequently do, have more than one imager 26. Also, depending on the optical configuration inside the workstation, the lower fold mirror could be eliminated.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for electro-optically reading targets by image capture, comprising:
   a housing;
   a window supported by the housing;
   an illumination source supported by the housing and configured to illuminate an area with illumination light directed along an illumination path through the window to the area;
   a solid-state imager supported by the housing and having an array of light sensors having an imaging field of view that extends through the window to the area;
   an imaging lens system configured to capture return illumination light from the area through the window, and to project the captured return illumination light along an imaging path to the array of light sensors; and
   a light-reflecting optical element located within both the illumination path and the imaging path, the light-reflecting optical element including:
      a light-reflecting, non-diffusing portion for folding the imaging path and for directing the captured return illumination light incident on the light-reflecting, non-diffusing portion along the folded imaging path to the array of light sensors; and
      a light-diffusing portion for folding the illumination path with diffusive reflection of the illumination light incident on the light-diffusing portion along the folded illumination path.

2. The apparatus of claim 1, wherein the window is substantially planar, and wherein the housing supports the window in one of a generally upright and a generally horizontal plane.

3. The apparatus of claim 1, wherein the illumination light source includes a plurality of light emitting diodes.

4. The apparatus of claim 1, wherein:
   the light-reflecting optical element is of one-piece construction;
   the light-reflecting, non-diffusing portion is located on a first part of the light-reflecting optical element; and
   the light-diffusing portion is located on an outer surface of a second part of the light-reflecting optical element.

5. The apparatus of claim 4, wherein the light-reflecting, non-diffusing portion has a surface finish less than about five micrometers, and wherein the light-diffusing portion has a surface finish exceeding about five micrometers.

6. The apparatus of claim 1, wherein the light-reflecting optical element is constituted of one of glass and plastic.

7. The apparatus of claim 1, further comprising a fold mirror located in both the illumination path and the imaging path, the fold mirror to:
   fold the folded imaging path and to reflect the captured return illumination light incident thereon to the light-reflecting optical element; and
   fold the illumination path and to reflect the illumination light from the light-reflecting optical element through the window.

8. An apparatus for electro-optically reading targets by image capture, comprising:
   a housing;
   a window supported by the housing;
   an illumination source supported by the housing, and configured to illuminate an area with illumination light directed along an illumination path through the window to the area;
   a solid-state imager supported by the housing and having an array of light sensors having an imaging field of view that extends through the window to the area;
   an imaging lens system configured to capture return illumination light from the area through the window and to project the captured return illumination light along an imaging path to the array of light sensors; and
   a light-reflecting optical element located within both the illumination path and the imaging path, the light-reflecting optical element including:
      a light-reflecting, non-diffusing portion to direct the captured return illumination light incident on the light-reflecting, non-diffusing portion along the imaging path to the array of light sensors; and
      a light-diffusing portion configured to fold the illumination path with diffusive reflection of the illumination light incident on the light-diffusing portion along the folded illumination path to scatter and blur an image of the illumination light source.

9. The apparatus of claim 8, wherein:
   the light-reflecting optical element is of one-piece construction;
   the light-reflecting, non-diffusing portion is located on a first part of the light-reflecting optical element; and
   the light-diffusing portion is located on an outer surface of a second part of the light-reflecting optical element.

10. The apparatus of claim 9, wherein the light-reflecting, non-diffusing portion has a surface finish less than about five micrometers, and wherein the light-diffusing portion has a surface finish exceeding about five micrometers.

11. A method of electro-optically reading targets by image capture, comprising:
   illuminating an area with illumination light emitted from an illumination light source and directed along an illumination path through a window of a housing to the area;
   capturing return illumination light from the area through the window; and
   projecting the captured return illumination light along an imaging path to an array of light sensors of a solid-state imager;
   wherein the illumination light is provided from and the return illumination light is returned to a light-reflecting optical element located within both the illumination path and the imaging path, wherein the light-reflecting optical element has a light-reflecting, non-diffusing portion for folding the imaging path and for directing the captured return illumination light incident on the light-reflecting, non-diffusing portion along the folded imaging path to the array, and has a light-diffusing portion for folding the illumination path with diffusive reflection of the illumination light incident on the light-diffusing portion along the folded illumination path to scatter and blur an image of the illumination light source.

12. The method of claim 11, wherein the window is substantially planar and in one of a generally upright and a generally horizontal plane.

13. The method of claim 11, wherein the illumination light source comprises a plurality of light emitting diodes.

14. The method of claim 11, wherein the light-reflecting optical element comprises one-piece having the light-reflecting, non-diffusing portion on a first part of the light-reflecting optical element and having the light-diffusing portion on an outer surface of a second part of the light-reflecting optical element.

15. The method of claim 14, wherein the light-reflecting, non-diffusing portion has a surface finish less than about five micrometers, and the light-diffusing portion has a surface finish exceeding about five micrometers.

16. The method of claim 11, wherein the light-reflecting optical element is formed of one of glass and plastic.

17. The method of claim 11, wherein a fold mirror is located in both the illumination path and the imaging path, the fold mirror folding the folded imaging path and reflecting the captured return illumination light incident thereon to the light-reflecting optical element, and folding the illumination path and reflecting the illumination light from the light-reflecting optical element through the window.

* * * * *